Dec. 29, 1931.  G. W. EARNEST  1,838,751

AIR FILTER

Filed July 8, 1929

GEORGE W. EARNEST
Inventor

By *Herbert E. Smith*
Attorney

Patented Dec. 29, 1931

1,838,751

UNITED STATES PATENT OFFICE

GEORGE W. EARNEST, OF COLFAX, WASHINGTON

AIR FILTER

Application filed July 8, 1929. Serial No. 376,513.

My present invention relates to improvements in air filters for use with the carbureters of internal combustion engines for straining or cleansing the air currents as they pass to the carbureter, of dust, sand, grit, and other materials that would be injurious if permitted to reach the operating parts of the motor. The primary object of my invention is the provision of a device of this character that is simple in construction and comprised of a minimum number of parts in order that the cost of production will be low, which may be assembled or attached to the air pipe of the carbureter with facility, which is effective in cleansing the air passing to the carbureter, and which may with convenience and when necessary, be detached from operative position for cleansing or repair. In carrying out my invention I utilize a separable, sectional, telescopic casing in which the filtering material, as mineral wool or other suitable granular or fibrous material, is carried, and I provide a simple attaching means whereby the filter may be attached to or detached from the air pipe with convenience when desired.

In the accompanying drawings I have illustrated one complete example of the physical embodiment of my invention wherein the parts are combined and arranged according to the best mode I have thus far devised for the practical application of the principles of my invention.

Figure 1:
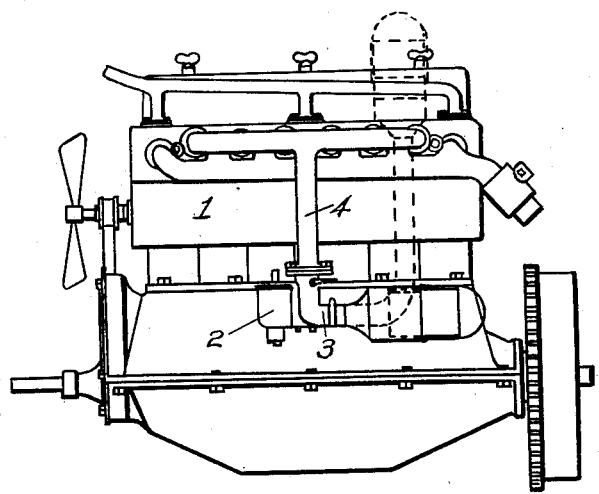
Figure 1 is a view in side elevation showing a gasoline motor equipped with the filter of my invention, and showing by dotted lines an alternate arrangement of the filter.
Figure 2:
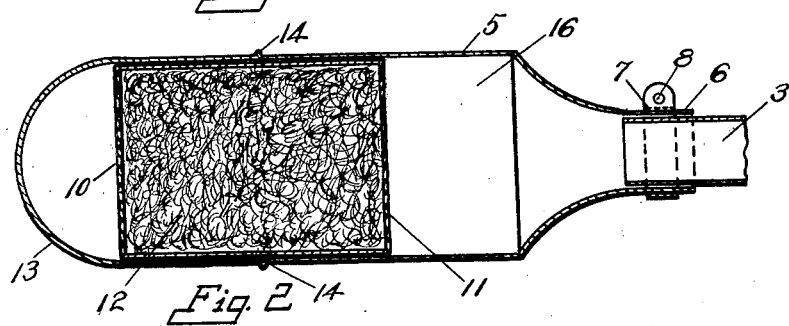
Figure 2 is an enlarged longitudinal sectional view of the filter showing it attached to the air pipe of the carbureter.
Figure 3:
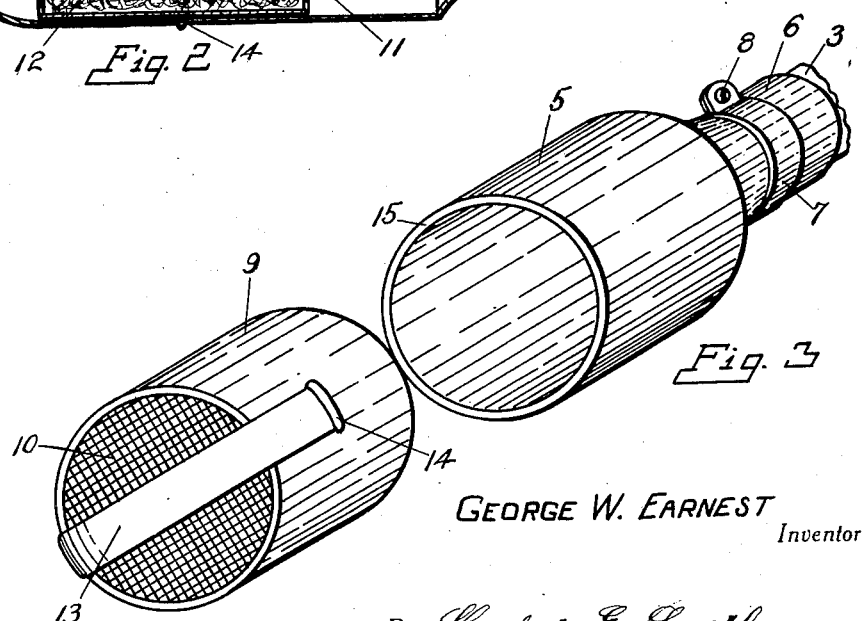
Figure 3 is an exploded, perspective view of the filter showing the sections separated, and one section attached to the air feed pipe.

In order that the general relation and relation of parts, together with the utility of the filter, may readily be understood, I have illustrated in Figure 1 a standard type of motor 1 having the usual carbureter 2 and its air intake pipe 3, with the carbureter connected as usual to the intake manifold 4 of the motor.

The filter comprises a pair of sectional or separable members of which the cup 5 is cylindrical in shape and provided with a reduced neck 6 of a diameter approximating the diameter of the air inlet pipe 3. The reduced neck 6 fits over the free end of the air pipe, and a clamp ring 7 that encircles the neck is clamped by means of a screw or bolt 8 to rigidly secure the filter on the end of the air pipe so that air currents passing to the pipe will pass through the filter.

The separable part of the filter comprises a cartridge or cylindrical case 9 slightly smaller in diameter than the cup 5 and adapted to slip or telescope into the cup and be retained in the cup by frictional engagement of the walls of the cup and cartridge. Both ends of the cylinder 9 are closed by reticulated heads or screens 10 and 11, and these heads retain the filtering material 12. This material may be of granular form or of fibrous form, but I find that mineral wool or steel wool are efficacious in separating the dust and grit from the air currents as they pass through the cartridge.

At the outer end of the cartridge a bail or loop 13 is fixed and adapted for use as a handle, and the ends 14 of this handle abut against the circular edge 15 of the cup when the cartridge is placed in position. The cartridge is telescoped within the open end of the cup and a space or chamber 16 is provided between the inner end of the cartridge and the neck of the cup to accommodate a quantity of filtered air emerging from the filter. The air currents are drawn through the reticulated heads and the material of the filter, to the filtered air chamber by suction from the cylinders of the engine, and the filtered air currents then pass through pipe 3 to the carbureter 2.

For the purpose of removing the accumulated dust, grit &c from the filtering material within the cartridge, the latter may be removed from the cup and a liquid cleanser, or other cleansing agent may be passed through the cartridge to remove the accumulated dust and grit, after which the cleansed cartridge may be replaced in the cup for future use.

In Figure 1 an alternate, or vertical position for the filter is illustrated by dotted lines, and in some instances this position is preferable to that illustrated in full lines, where the cartridge of the filter is positioned at the rear of the motor.

Having thus fully described my invention, what I claim as new and desire to secure by Letters Patent is:

In an air filter the combination with an open-end cup having solid walls, and means for attaching said cup to an air pipe, of a separable, telescopic cartridge inserted in the open end of the cup and having solid side walls for frictional contact with the walls of the cup, said cartridge having reticulated ends and a filler of filtering material, a handle on the exterior end of the cartridge, and abutments on the handle for engagement with the open end of the cup.

In testimony whereof I affix my signature.

GEORGE W. EARNEST.